(12) United States Patent
Bharti et al.

(10) Patent No.: US 11,910,221 B1
(45) Date of Patent: Feb. 20, 2024

(54) EDGE SERVICE DEPLOYMENT WITH NETWORK SLICE INVOCATION

(71) Applicant: INTERNATIONAL BUSINESS MACHINES CORPORATION, Armonk, NY (US)

(72) Inventors: Harish Bharti, Pune (IN); Rajesh Kumar Saxena, Thane East (IN); Sandeep Sukhija, Rajasthan (IN); Deepak Bajaj, Jaipur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/818,731

(22) Filed: Aug. 10, 2022

(51) Int. Cl.
*H04W 24/10* (2009.01)
*H04L 43/02* (2022.01)
*H04W 48/18* (2009.01)

(52) U.S. Cl.
CPC .............. *H04W 24/10* (2013.01); *H04L 43/02* (2013.01); *H04W 48/18* (2013.01)

(58) Field of Classification Search
CPC ........ H04W 24/01; H04W 48/18; H04L 43/02
USPC ......................................................... 709/224
See application file for complete search history.

(56) References Cited

U.S. PATENT DOCUMENTS

| | | | | |
|---|---|---|---|---|
| 11,252,655 | B1* | 2/2022 | Gupta | .................. H04L 67/02 |
| 2016/0125463 | A1* | 5/2016 | Ilghar | .................. G06Q 30/06 |
| | | | | 705/14.55 |
| 2019/0243737 | A1* | 8/2019 | Savino | ................ G06F 11/3696 |
| 2019/0373443 | A1* | 12/2019 | Palaniappan | ........... H04W 8/18 |
| 2020/0007460 | A1* | 1/2020 | Guim Bernat | ........ G06F 9/5077 |
| 2020/0296653 | A1* | 9/2020 | Huang | .................. H04W 40/00 |
| 2021/0021533 | A1 | 1/2021 | Guim Bernat et al. | |
| 2021/0135951 | A1* | 5/2021 | Goudarzi | ................ G06F 30/27 |

(Continued)

FOREIGN PATENT DOCUMENTS

| | | |
|---|---|---|
| CN | 112737817 A | 4/2021 |
| CN | 113726847 A | 11/2021 |

(Continued)

OTHER PUBLICATIONS

Gu et al., "HyEdge: Optimal Request Scheduling in Hybrid Edge Computing Environment", Distributed, Parallel, and Cluster Computing (cs.DC), pp. 1-11, arXiv:1909.06499v1, Sep. 14, 2019 (Year: 2019).

(Continued)

*Primary Examiner* — Tauqir Hussain
(74) *Attorney, Agent, or Firm* — Maeve Carptenter, Esq.; Kevin P. Radigan, Esq.; Heslin Rothenberg Farley & Mesiti P.C.

(57) ABSTRACT

Edge service deployment with network slice invocation is provided, which includes obtaining one or more service-related parameters for network slice invocation to support an edge service instance, and requesting a network slice from a network based on the obtained one or more service-related parameters. The requesting from the network is via a collaboration platform. Further, the edge service deployment and network slice invocation includes receiving from the network, based on requesting of the network slice, network slice invocation codes, and initiating activating of the edge service instance over the network slice of the network using the network slice invocation codes.

20 Claims, 4 Drawing Sheets

(56) References Cited

U.S. PATENT DOCUMENTS

| | | | |
|---|---|---|---|
| 2021/0144517 A1 | 5/2021 | Guim Bernat et al. | |
| 2021/0219219 A1* | 7/2021 | Sundararaj | H04W 48/18 |
| 2022/0278955 A1* | 9/2022 | Roy | H04L 61/4541 |
| 2022/0295353 A1* | 9/2022 | Gautam | H04W 4/30 |
| 2023/0007573 A1* | 1/2023 | Kolan | H04W 28/0268 |

FOREIGN PATENT DOCUMENTS

| | | |
|---|---|---|
| CN | 114268997 A | 4/2022 |
| CN | 114666821 A | 6/2022 |
| EP | 3 306 987 A1 | 11/2018 |

OTHER PUBLICATIONS

IBM, "IBM Cloud Pak for Business Automation", Downloaded at: https://www.ibm.com/docs/en/cloud-paks/cp-biz-automation/19.0.x?topic=automation-cloud-pak-software, published online Mar. 3, 2021 (4 pages) (Year:2021).

Kabi et al., "Blockchain-Based Distributed Marketplace", University of Derby—Cyber Security Research Group, College of Engineering & Technology, Derby, UK, published Jul. 18, 2018 (13 pages) (Year: 2018).

Leonardian Online Brochure, "The Marketplace for Digital Assets and Services", Downloaded on Jul. 18, 2022, at: https://leonardian.com/ (6 pages) (Year: 2022).

Mel et al., "The NIST Definition of Cloud Computing," National Institute of Standards and Technology, Information Technology Laboratory, Special Publication 800-145, Sep. 2011 (pp. 1-7) (Year: 2011).

Nokia Online Brochure, "Data Marketplace: Secure Data Exchange and AI/ML Orchestration with Blockchain", Downloaded on Jul. 18, 2022, at: https://www.nokia.com/networks/services/data-marketplace/ (8 pages) (Year: 2022).

International Search Report (ISR) & Written Opinion for PCT/CN2023/0111991, dated Nov. 13, 2023 (7 pages).

\* cited by examiner

EDGE SERVICE DEPLOYMENT WITH NETWORK SLICE INVOCATION

BACKGROUND

One or more aspects relate, in general, to edge computing, and more particularly, to improving edge computing across a network by enhanced edge service deployment and network slice invocation.

In a cloud environment, edge computing (i.e., computing at or near a boundary) enables processing and/or storage of data to be provided at, or closer to, the device(s) where operations are being performed. Accordingly, edge computing can eliminate the need for data to be processed or stored being transmitted to a central location (e.g., a central cloud server), which may be physically located a significant distance from the device(s). Although this configuration may not provide a substantial change to the services being provided from an individual device perspective, the large increase of Internet of Things (IoT), and other electronic devices, including mobile devices, exponentially increases network requirements when utilizing cloud services, which can cause an increase in latency, potentially resulting in lower quality of service, higher bandwidth costs, etc. Advantageously, edge computing can assist in alleviating these issues.

By way of example, multi-access edge computing (MEC) provides a computing approach where cloud-computing capabilities in an information technology (IT) service environment are provided at the edge of a network. MEC provides an ecosystem in which applications and services can be flexibly and rapidly deployed.

In cellular communication, 5G is the next generation of broadband cellular networks, which allow for significantly increased communication rates. MEC has implementations for various networks, and 5G implementations have been expanding as service providers adopt this most current and technology-advanced system for customers. When combined, MEC and 5G can be a powerful force in the world of computing. The emergence of 5G network capabilities continues to increase with the number of connected devices on a network, which spurs the need for edge computing to help distribute networking demands. Applications that rely heavily on a consistent network connection, rapid deployment, and low latency include burgeoning technologies such as artificial intelligence (AI), IoT, virtual reality (VR), augmented reality (AR), etc. MEC and 5G networking together allow for simultaneous usage of a massive number of connected technologies without incurring network outages due to traffic bottlenecks.

SUMMARY

Certain shortcomings of the prior art are overcome, and additional advantages are provided herein through the provision of a computer program product for facilitating processing within a computing environment. The computer program product includes one or more computer readable storage media and program instructions embodied therewith. The program instructions are readable by a processing circuit to cause the processing circuit to perform a method which includes obtaining one or more service-related parameters for network slice invocation to support an edge service instance, and requesting a network slice from a network based on the obtained one or more service-related parameters, with the requesting from the network being via a collaboration platform. The method also includes receiving from the network, based on the requesting of the network slice, network slice invocation codes, and initiating activating of the edge service instance over the network slice of the network using the network slice invocation codes.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures.

One or more aspects of an illustrative embodiment can be implemented in hardware, software, or a combination thereof.

Figure 1:
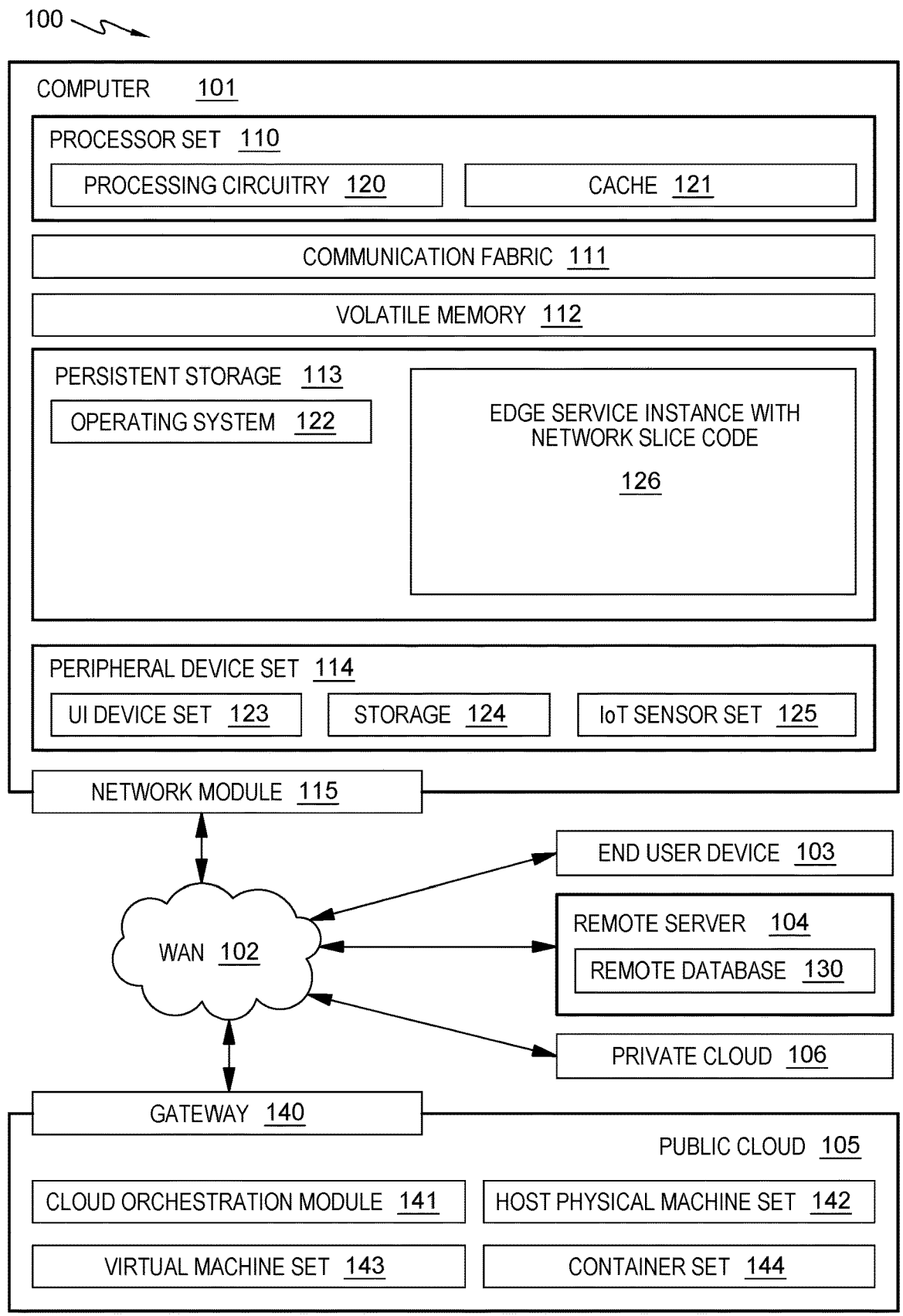
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1 as operating system 122 and edge service instance with network slice code 126, which are stored in persistent storage 113, as well as cloud orchestration module 141, virtual machine set 143, and container set 144, which are part of public cloud 105, in the example computing environment 100 of FIG. 1.

As context, containerization is the packaging of software code (for instance, to implement a service or microservice) with its dependencies, such as operating system libraries and/or other dependencies, used to run the software code to create a single, lightweight executable, referred to as a container. The container is portable in that it runs consistently and reliably on any information technology infrastructure. In one or more embodiments, the software code can be an application, such as an edge application or edge service instance in the case of edge-based computing. A container is created from a container image, which is a static file that includes executable program code that can be run as an isolated process on a computing or information technology (IT) infrastructure. One image can be used to run one or more containers, which are runtime instances of the container image. Containers are lightweight (e.g., they share the machine's operating system), efficient, easy to manage, secure, and portable.

One example of a product used to provide and manage containers is Kubernetes®, which is an open-source system for automating deployment, scaling and management of containerized applications. (Kubernetes® is a Registered Trademark of the Linux Foundation in at least one jurisdiction.) Kubernetes groups containers that make up an application into logical units for easy management and discovery. In operation, Kubernetes orchestrates a containerized application to run on a cluster of hosts (or nodes), and automates deployment and management of cloud-native applications using on-premise infrastructure or public cloud platforms. The Kubernetes system is designed to run containerized applications across a cluster of nodes (or servers or devices), which can be at a single geographic location or distributed across multiple geographic locations. In one or more implementations, a cluster is a set of nodes (whether physical computing resources or virtual computing resources) running Kubernetes agents, managed by the Kubernetes control plane.

Container orchestration is the automation of much of the operational effort required to run containerized workloads and services. Orchestration includes a wide range of processes required to maintain a container's lifecycle, including provisioning, deployment, scaling (up and down), networking, load-balancing, and more. Note that Kubernetes is one example only of a orchestration platform that can be used to manage, for instance, service deployment, such as disclosed herein. In one or more embodiments, other platforms, such as Docker™, Function as a Service (FaaS), etc., can be used to manage service deployment, in accordance with one or more aspects disclosed. (Docker™ is a Trademark or Registered Trademark of Docker, Inc., of San Francisco, California, USA.)

Use of edge-based computing, including edge application services, advantageously reduces the volume of data to be transferred, as well as the subsequent traffic, and distance the data must travel. This results in a lower latency and reduces transmission costs. Computational offloading to the edge (for example, to one or more edge devices or systems on a network, such as of a cellular network), can advantageously benefit response times for real-time applications. In one or more implementations, edge-based containers are decentralized computing resources located close to or at the end-user equipment (e.g., device or system) in order to, for instance, reduce latency, save bandwidth, and enhance the overall digital experience.

As noted, 5G is the next generation of broadband cellular networks, which allow for significantly increased communication rates. In one or more implementations, a cellular network includes multiple edge sites, each with a respective cell tower for wirelessly interfacing with various types of user equipment within range of the cell tower. In one embodiment, each edge site can include a radio access network (RAN) interfacing any edge site computing infrastructure and the next generation (5G) core network. The core network can (in one embodiment) facilitate communication with one or more cloud-based computing resources, such as discussed herein. In one implementation, the next generation core network can include, for instance, a user plane function (UPF) which interfaces the radio access network(s) (RANs) and a data network, such as a local-area network (LAN), a wide-area network (WAN), such as the Internet, or a combination thereof. The data network(s) can include one or more wired and/or wireless networks that are capable of receiving and transmitting data, such as data related to one or more of the edge services or applications referenced herein. In addition, the core network can include, for instance, an access mobility function (AMF), which interfaces, in one embodiment, the radio access networks (RANs) of the edge sites with a session management function (SMF) facility and a unified data management (UDM) facility. Session management function (SMF) further interfaces, in one embodiment, with a policy control function (PCF), as will be understood by those skilled in the art. In operation, user equipment (or edge devices) accessing the cellular network can be, in one or more embodiments, one or more wireless user devices, such as smartphones, mobile devices, gaming devices, wireless vehicle devices/systems, wireless computers, etc.

With the advent of 5G networks, certain cloud-computing capabilities, such as for an information technology (IT) service environment, can be provided at the edge of the network, particularly in latency-sensitive applications, such as enterprise applications, manufacturing applications, IoT applications, health care applications, etc., are being run increasingly as edge services or micro-services. For instance, in one or more embodiments, a container orchestrator interfaces with multiple nodes or edge devices which include one or more service applications, or edge services of a host service.

Edge site-deployed application orchestration, such as discussed herein, balances two often-conflicting requirements. The first requirement is to maximize the quality of service (QoS) by, for instance, minimizing response time for each edge user. This implies, for instance, that by moving an application close to the edge, more replications of the application are required. The second requirement is to minimize required cluster resources due to resource constraints at the edge by, for instance, optimizing application placement to, for instance, have less replications of applications running, and thereby reduce overhead. Balancing the two requirements can be challenging.

Currently, if an end user requires an application service that is outside the current configuration of a network, then it can be difficult to reconfigure the network to align with the inherent edge computing benefits driving the request for service. Disclosed herein are computer program products, computer-implemented methods, and computer systems, where program code executing on one or more processors performs a novel, hybrid edge-provisioning process using a secure collaboration platform invocation that coordinates with the next generation network, or network provider. For instance, to capture the power of narrowband-based network slices, a framework for building a virtualized network function (or service) from an existing (or prior) instance of an edge service is provided. In one or more implementations, activating of a new edge service instance can include cloning a new edge service instance from the existing or prior instance of the edge service, with specifications that revise (e.g., scale up or scale down) the resource edge service to match the bandwidth provisioned in the network slice. Further, in one or more implementations, a solution for cloning an edge service instance is provided which is able to request an exact network slice from the next generation network to match the needs of the edge service.

Prior to further describing embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as edge service instance with network slice code 126. In addition to block 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 126 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
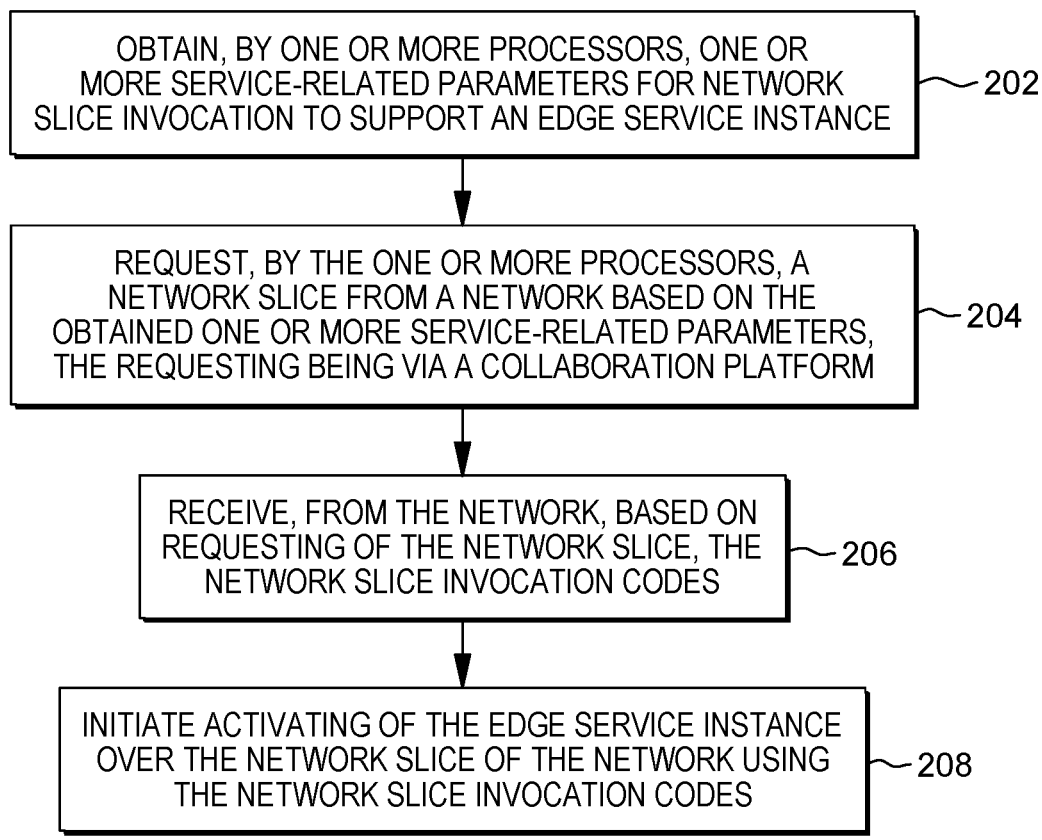
FIG. 2 depicts one embodiment of an edge service instance deployment and network slice invocation workflow, in accordance with one or more aspects of the present invention.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud As discussed, embodiments of the present invention include computer program products, computer-implemented methods, and computer systems, where program code executing on one or more processors performs an edge service deployment with network slice invocation method, such as method 200 depicted in FIG. 2. As illustrated, method 200 can include, in one embodiment, obtaining, by one or more processors, one or more service-related parameters for network slice invocation to support an edge service instance 202, and requesting, by the one or more processors, a network slice from a network based on the obtained one or more service-related parameters 204. The request can be, for instance, via a collaboration platform, such as a secure subscription-based collaboration platform. In one or more embodiments, the collaboration platform can be separate from the service provider, and the network provider. The method further includes, in one embodiment, receiving, from the network, based on the requesting of the network slice, network slice invocation codes 206. In addition, the method includes (in one embodiment) initiating activating of the edge service instance over the network slice of the network using the network slice invocation codes 208.

In one or more embodiments, obtaining the one or more service-related parameters is with reference to service-related parameters of prior instances of the edge service. Further, in one or more embodiments, initiating activating of the edge service instance can include cloning the edge service instance from another, prior instance of the edge service. In one embodiment, initiating activating the edge service instance is at an edge device, and cloning the edge service instance includes cloning the edge service instance from the other instance of the edge service of another edge device, such as another instance of the edge service located geospatially close to the edge device or nodal edge to deploy the service.

In one or more embodiments, the obtained one or more service-related parameters for network slice invocation include anticipated bandwidth required for the edge service instance, and anticipated execution time of the edge service instance. Further, in one implementations, the obtained one or more service-related parameters further includes anticipated time for cloning the edge service instance from the other instance of the edge service. In one embodiment, requesting the network slice from the network includes requesting the network slice from the network tailored to the anticipated bandwidth required for the edge service instance, the anticipated execution time of the edge service instance, and the anticipated time for cloning the other instance of the edge service.

Numerous inventive aspects are disclosed herein in the concepts presented. For instance, computer program products, systems and methods are presented for edge service deployment with network slice invocation, where a collaboration platform separate from the next generation network is used to request at runtime an identified channel point-to-point network slice of a given bandwidth and given time interval. Further, runtime identification and cloning of an edge service or application (e.g., a binary or executable code function), that is geospatially closer to the edge device requesting the service, is provided. In one or more embodiments, provisioning of a request for an optimized and derived narrow bandwidth network slice in real-time is disclosed, to allow effective cloning of the edge service or edge service binary.

Methods are also presented that allow for the validation of a service request and provisioning of host edge transactions which pass processing control from a previously-known host service, e.g., executing on a cloud-based resource, to a newly-spawned edge service (based, e.g., on a geospatial filter). In one or more embodiments, disclosed herein are program products, systems and methods which allow for cloning of an edge service (or edge service binary) to a nodal edge device or edge server from, for instance, a nodal edge source, via provisioning from the next generation (5G) network provider an exact network slice required for the edge service cloning and edge service implementation, which tailors the network cost to the anticipated edge service usage. Certain aspects disclosed herein are referred to as hybrid edge service provisioning, where a framework for cloning an edge service is provided based on invocation of a collaboration platform, or secure subscription-based platform, through which the service provider and network provider securely communicate. For instance, the requesting system or device triggers a request for services via the collaboration platform, and the activation process provisions transfer of a vertical slice of the referenced architecture with the determined bandwidth, which facilitates obtaining the exact amount of network slice bandwidth needed for the edge service instance from the next generation network.

In one or more implementations, the hybrid edge provisioning disclosed herein includes a method for cloning based, for instance, on a collaboration platform invocation. The requestor system, for instance, a node spawner, triggers a request for services, post identification of services hosted in a marketplace of the collaboration platform. The activation process provisions transfer a vertical slice of the referenced architecture over the calculated bandwidth, which facilitates obtaining an exact amount of network slice bandwidth needed for the edge service instance from the next generation network.

A service provider needs to ensure the synchronous state of a service to be made available at an edge device. Depending on resource requirements, runtime provisioning can be decided. Based on the defined permissible latency, the process can configure services either at a NodalEdgeSource (edge provisioning server), or at the edge device (NodalEdge or edge server). In one or more implementations, the wait time for provisioning the edge service is to be minimized. In one embodiment, the system can transfer one or more binaries from the host service (e.g., NodalEdgeSource) only if a nearby edge server in the same geographic area or zone does not have a binary that can be cloned to deploy the new edge service instance at the edge device. Post identification of a service provider during an activation process phase, a nodal complement can assist in identifying whether a new binary is required or not. In one or more embodiments, a state manager can be used where state details of the edge service binaries are stored. Based on an initial and final configuration state on the edge device, either the migration or deletion of a partition (binary) replica is done. In one or more embodiments, a solution for effective cloning of binaries to the required edge device by the NodalSpawner, NodalReplicatingVector, and NodalEdgeSource components of a host service, is provided which invokes the network slice request to the 5G network.

Advantageously, disclosed herein are enhancements to the edge computing paradigm that leverage certain novel hybrid edge provisioning processes to create a network slice from a 5G network. In one or more embodiments, multiple edge nodes (or edge devices) are envisioned, which run similar services (or binaries), with the service or function being maintained via a central host service, such as a cloud-based service provider. When a particular edge device is identified for updating to execute the edge service, the central host (which maintains a repository of edge service updates), determines, using a process and system framework as disclosed herein, the invocation parameters required to create the network slice, which is customized for the particular edge service function to be run on the edge device. The entire set of parameters, configurations and updates to the operating system can be set forth for the edge device. The provisioning request for an optimized and derived narrowband network slice in real-time is disclosed, which is also combined with a capability to clone the edge service or binary, so that the edge service can be activated to stabilize the new hybrid edge and support an end-to-end transaction for a specific end user on the edge as a cloud function. The entire transaction can be supported by use of a commercially available enabling platform, referred to herein as the collaboration platform, through which the network slice can be invoked as a service from the 5G network provider, with (for instance) the entire history of the transaction configurations being maintained centrally at the host service.

Figure 3:
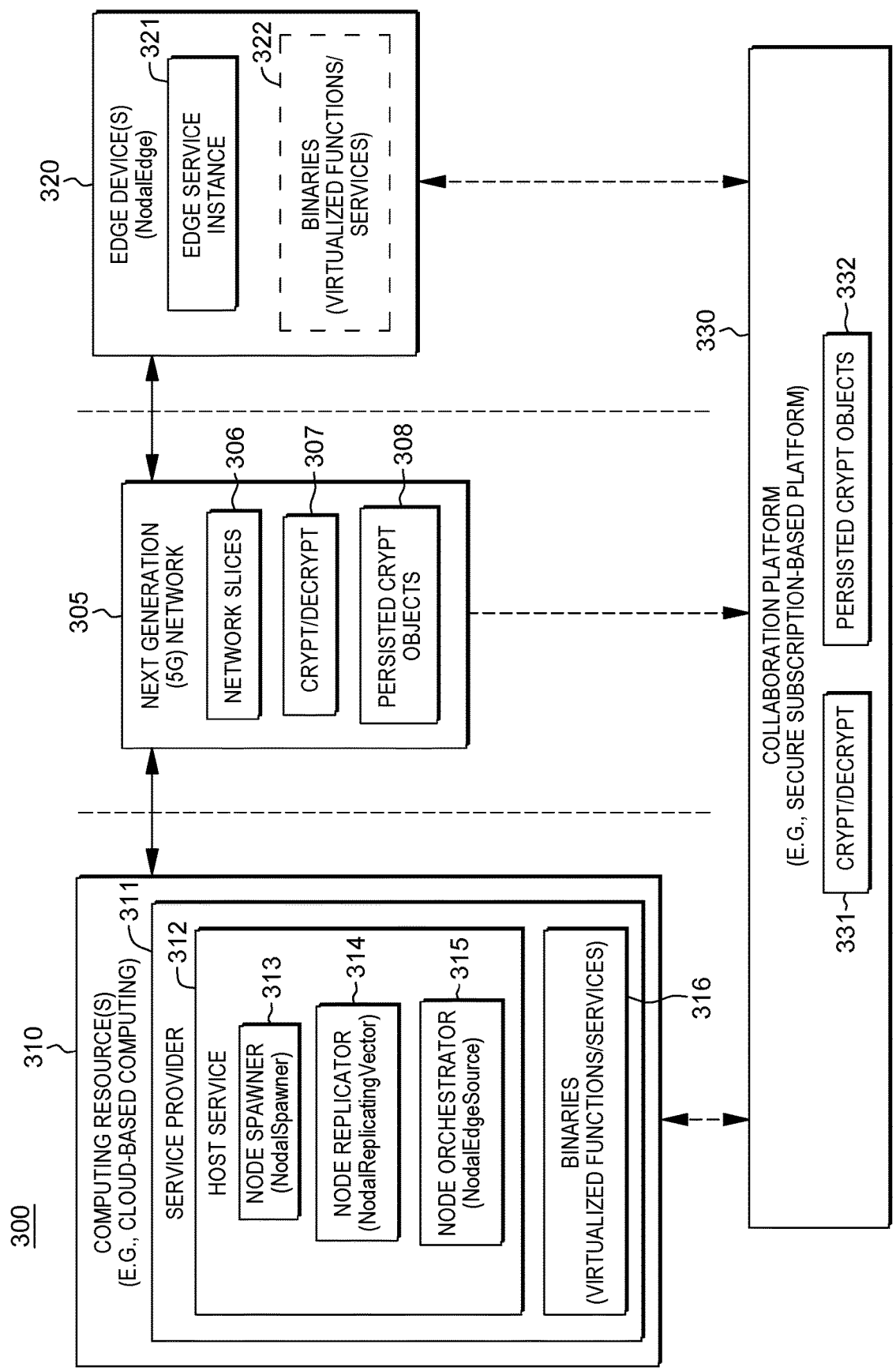
FIG. 3 depicts another embodiment of a computing environment to incorporate and/or use one or more aspects of the present invention.

FIG. 3 depicts another embodiment of a computing environment 300 to incorporate and/or use one or more aspects of the present invention. Those skilled in the art will understand that, in one or more embodiments, certain aspects of computing environment 300 can be the same or similar to those described above in connection with computing environment 100 of FIG. 1. Computing environment 300 depicts, by way of example, a technical environment or system into which various aspects of some embodiments of the present invention can be implemented. By way of example, computing environment 300 includes a next generation cellular network, denoted 305, such as a 5G network, for wirelessly interfacing with various types of edge devices or systems 320. In one embodiment, next generation network 305 facilitates edge device communication with, and/or data transfer to, one or more computing resources 310, such as one or more cloud-based computing resources. In the embodiment illustrated, computing resource(s) 310 executes program code implementing one or more aspects of a service provider 311 including, for instance, a host service 312 and a database containing one or more binaries, or executable code, implementing virtualized functions and/or services of the service provider 311, such as one or more edge services. As depicted, in one embodiment, the program code implementing host service 312 can further include program code implementing a node spawner (NodalSpawner) 313, a node replicator (NodalReplicatingVector) 314, and a node orchestrator (NodalEdgeSource) 315, which are described further below with reference to the process embodiment of FIG. 4.

In the embodiment of FIG. 3, next generation (5G) network 305 provides network slices 306. As understood in the art, network slicing is a network configuration that allows multiple networks (virtualized and independent) to be created on top of a common physical infrastructure. In one embodiment, each virtual or logical network can be designed to serve an identified function, and can include all required network resources, configured and connected end-to-end.

In one embodiment, edge device(s) 310 includes an edge service instance (or nodal edge) 321 to perform, for instance, an edge computing function at or close to the end user device. In one or more embodiments, edge device(s) 310 can further include one or more binaries 322, such as saved, virtualized functions and/or services. For instance, in one embodiment, an edge device, such as edge device 320, can include a previously-executing instance of an edge service as a binary in persistent storage.

As illustrated, computing environment 300 further includes a collaboration platform 330, which in one embodiment, is a secure subscription-based collaboration platform, such as commercially available from a variety of sources.

For instance, in one or more embodiments, collaboration platform 330 is a blockchain-based distributed platform or marketplace for digital assets and services. In one or more other embodiments, collaboration platform 330 can be a secure data exchange with artificial intelligence (AI) and/or machine learning orchestration with blockchain. As used herein, a data marketplace facilitates data trading and exchange processing securely. In one or more embodiments, encrypting and decrypting processes, along with persistent encrypted objects, are used to provide security among the service provider(s) and network provider(s) to implement edge service deployment with network slice invocation, such as described herein.

In the embodiment of FIG. 3, network 305 also includes encryption and decryption (crypt/decrypt) program code 307 and one or more persisted, encrypted (crypt) objects 308 for use in communicating with, for instance, service providers across collaboration platform 330. Further, collaboration platform 330 includes encryption/decryption (crypt/decrypt) code 331, and persisted encryption (crypt) objects 332 for use in facilitating secure communication between, for instance, service provider 311 and network 305 across collaboration platform 330. In one or more embodiments, collaboration platform 330 provides a framework for allowing cloning of an edge service instance to the required edge device or server via, for instance, NodalSpawner 313, NodalReplicatingVector 314, and NodalEdgeSource 315 (in one embodiment), which invoke the network slice request to the third party 5G network 305 provider.

In one or more embodiments, the collaboration platform framework/interface is used for hybrid edge provisioning, such as disclosed herein. The disclosed method and framework provide a solution based on a collaboration platform invocation, a decision binder, orchestrator and collaboration platform crypt object, which assist with the digital, autonomous deploying of an edge service instance with network slice invocation. The requestor system (e.g., host system) triggers the request for services, and a decision binder identifies the service that is appropriate and available in the marketplace supported by the collaboration platform. The service provider and network provider implement the guidelines required for services to be available in the marketplace of the collaboration platform. In one or more embodiments, a decision-binding element is added and a protocol is established to allow for the automated deployment.

Figure 4:
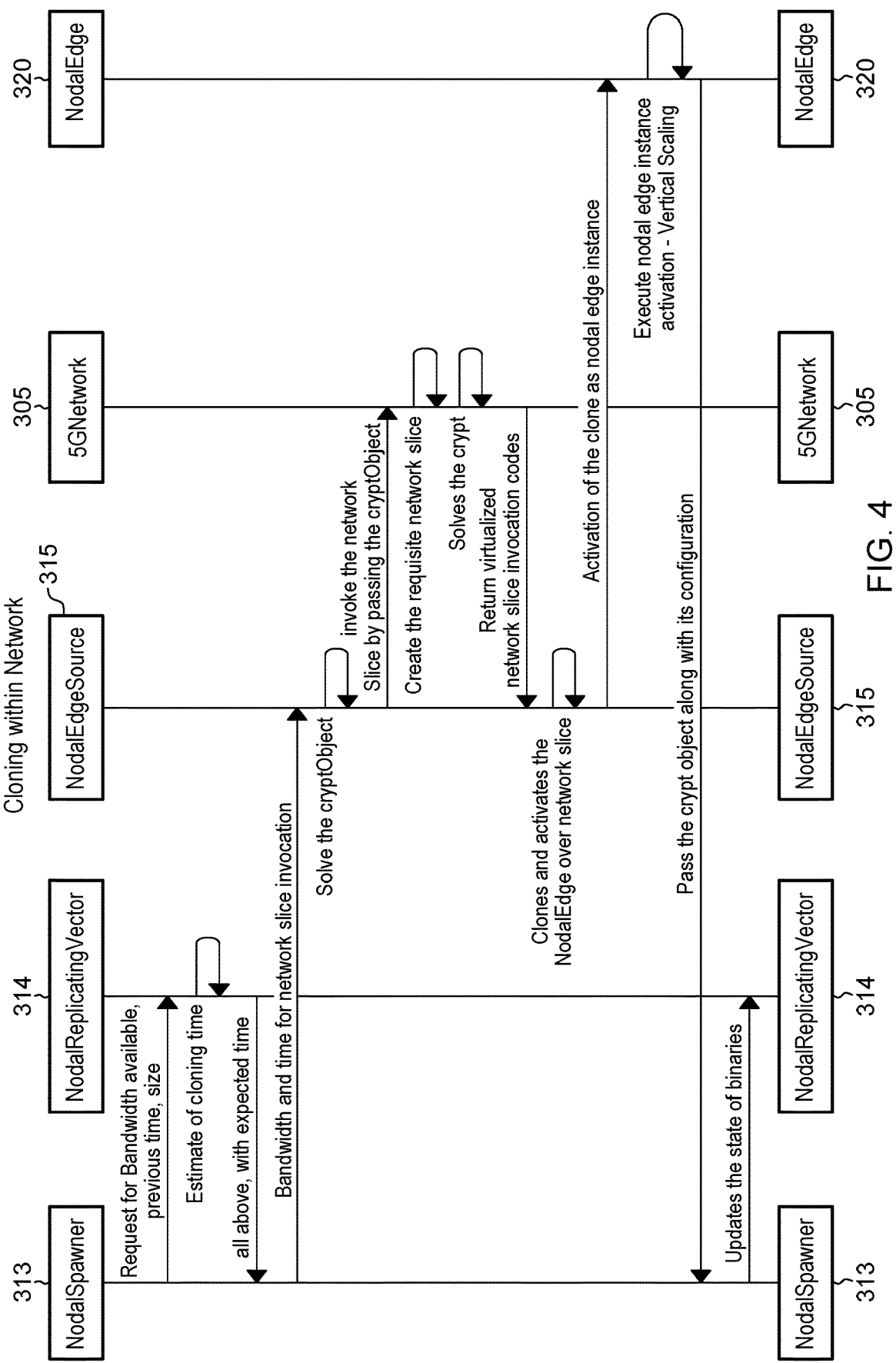
FIG. 4 illustrates one embodiment of an edge service instance deployment and network slice invocation workflow for the computing environment of FIG. 3, in accordance with one or more aspects of the present invention.

The service provider ensures that the state of the edge service to be made available at the edge device meets requirements, as latency can negatively affect the edge application. Compute-intensive operations can be performed at the edge provisioning server (or NodalEdgeSource), and comparatively less-intensive operations can be performed at the edge device. Depending on the resource requirements at runtime, a process such as depicted in FIG. 4 can be employed. For instance, depending on a latency requirement, runtime parameters can be decided. In one or more embodiments, how much data, compute capacity, bandwidth, etc., is needed, can be considered by the framework during provisioning of the services at the edge. Based on the defined permissible latency, the framework configures the services, either at the host service (e.g., cloud-based), or at the edge device (e.g., hybrid edge). In one or more implementations, the wait time for the end user should approach zero. The framework disclosed herein ensures transaction consistency across the computing environment systems, including the host service, network and edge device.

In one or more implementations, the method and framework for hybrid edge provisioning and computing are based on a collaboration platform being used in association with protocol invocation, decision binding, orchestration, crypt objects, etc., to assist in the digital, autonomous deployment of an edge service instance and invocation of a customized network slice. The protocol framework for executing an edge service or edge cloud function, can depend on the type of Quality of Service (QoS) requirement (e.g., agreed delay, bandwidth available, etc.), which can be decided at runtime. Depending on this perspective, the runtime can change between the host service (i.e., edge provisioning server) and the edge device. The service provider provisions the services via implementing an agreed protocol through the collaboration platform. A client request can be received via a third-party provider for a specific service and/or profile via an invoker, to ensure that a proper service and/or profile is invoked out of the various available services supported by the collaboration platform. The third-party provider/invoker passes the request object to the third-party binder, i.e., decision binder, which ensures that the profile selection of the registered service provider is available in the marketplace at the collaboration platform after solving the crypt object underlying the protocol. Post successful invocation and security validation via solving the crypt object, the third-party binder can invoke a qualified call after adding the crypt object, hence the framework ensures that the security constraints are not violated throughout. As soon as the service provider (or host service) receives the request, it is redirected to the host lead orchestrator, which (post successful validation of the crypt object) sends an acknowledgement, which in turn confirms the trade agreed for in engagement to the third-party provider entity.

Depending on the edge device, edge cloud functions or edge service instances can be provided with or without replication. The framework introduces virtualized functions or virtualized edge services, execution of which requires context and availability. The possibility of missing a Quality of Service (QoS) can be mitigated via determining probable partitioning of the function runtime. A capacitor data model can be considered favorable due to time-series unstructured schema-definition for persistence, allowing the selected block replication over a file-driven replication. The edge service instance invocation can be achieved by making a change to the required state of a virtualized function, which is being referred to as the configuration of the replica of partition. If a server has a replica of a partition in the initial and final configuration, and no action is required, then there should be no migration of a replica of the partition to the edge device. However, that may be for a small subset of scenarios. The need for replica migration is captured where the servicer (edge device) does not have the replica of the partition in the initial configuration.

One embodiment of the process is depicted in FIG. 4, and is described below. Depending on the type of Quality of Service (QoS) required (e.g., agreed delay), the bandwidth needed is decided at runtime. In one or more embodiments, the host service 312 (FIG. 3), provisions the edge service using collaboration platform 330 to implement, for instance, registration of services, identification of services, and/or provisioning of services. As noted, the processes disclosed provide a framework for cloning of a vertical slice of the referenced architecture to the edge device for provisioning of an edge service instance. As depicted in FIG. 4, certain aspects of the process can be managed by node replicator 314 (or NodalReplicatingVector) on node spawner (NodalSpawner) 313 request. NodalReplicatingVector 314 is a program code agent or facility which provides (in one embodiment) the required bandwidth, a previous clone partitioning time and size, and expected time for a current cloning process of the edge service instance.

Based on the bandwidth available, previous partition clone time, and estimated cloning time for the edge service instance, NodalSpawner 313 requests the bandwidth and time for network slice invocation from NodalEdgeSource 315. NodalEdgeSource (or server) 315 receives the request from the NodalSpawner, and to ensure request validity, the crypt object is solved (or decrypted) at the NodalEdgeSource 315. As noted, the NodalSpawner 313 passes the expected bandwidth required for the clone to NodalEdgeSource 315, and based on these inputs, the NodalEdgeSource invokes 5G network 305 and the virtualized function via the collaboration platform so that a narrow-band activation slice is provisioned, which (in one embodiment) is a customized or tailored network slice of the required bandwidth as provided by the NodalSpawner after the 5G network has solved the crypt object. Once solved, 5G network 305 returns the virtualized network slice invocation codes to NodalEdgeSource 315. NodalEdgeSource 315 clones and activates the NodalEdge (or edge service instance) over the network slice, with activation of the clone as a service instance being provided to the edge device (NodalEdge) 320. In one or more embodiments, the edge device or server updates the SSH into the root and executes the edge service instance activation code, that is, vertical scaling. Once activated, NodalEdge 320 passes the crypt object along with its configuration back to NodalSpawner 313. Upon solving the crypt object successfully, NodalSpawner 313 updates the state of binaries in the database maintained by NodalReplicatingVector 314 for future reference.

In one or more embodiments, the edge service instance being cloned is a virtualized function or service, such as a cloud function that is to be executed at the edge device. In one embodiment, to clone an edge service instance, context and availability are determined (e.g., by the NodalSpawner and NodalReplicatingVector) to make the process efficient. By way of example, a partition (P) can refer to the vertical slice of the requisite layers virtualized in the referenced architecture. The partition is analogous to the executable binary (or edge service instance) customized to the desired service. As indicated by the definitions below, process efficiency can be enhanced by determining where a service instance for cloning is available, based on the initial configuration. Further, the bandwidth can be determined and created for where the edge service instance clone needs to geospatially be transferred from or to, and how much time is required to effect the cloning.

Edge Partitioning—Entity Definition

S=Set of servers across all data centers,
Where, $$S=\{s_1, s_2, \ldots, s_i, \ldots, s_k, s_{|S|}\} \quad (1)$$

$C^I=|S|\times|P|$ matrix representing an initial configuration
Where, $$C_{i,j}^I = \begin{cases} 1 & \text{if replica of } p_j \text{ is stored on } s_i \\ 0, & \text{otherwise} \end{cases} \quad (2)$$

$\beta$=Scalar–latency constant \quad (3)

Z=|S|×|P|×T matrix representing replica placement

Where, $$z_{i,j,t} = \begin{cases} 1 & s_i \text{ has replica of } p_j \text{ at time } t \\ 0, & \text{otherwise} \end{cases} \quad (4)$$

$$R=|S|\times|P|\times|S|\times T \text{ matrix}, \quad (5)$$

Where,
$r_{i,j,k,t}$ represent the bandwidth allocated for migrating replica of pj from si Identification/Participation The servers $s_i$ that hold the replica of partition $p_j$ at time t are identified, as from $z_{i,j,t}$, (which indicates the potential sources of the replica) by restricting the participation of servers in the replica migration that hold a replica of partition $p_j$ in the initial configuration.

$$\{C_{k,j}^I \leq \beta \cdot z_{i,j,t}\}_{\forall 1 \leq k \leq |S|, 1 \leq j \leq |P|, 1 \leq t \leq T} \quad (6)$$

A server holds a copy of the replica when,
the sum of all the bandwidth allocated, $r_{i,j,k,t'}$ (through the graph traversals) to the migration of the partition
that replica of partition $p_j$ from source $s_j$ to destination $s_k$, in previous time instances $\forall t'<t$,
equals the size of the partition $p_j$.

Thus, to identify the possible partitions that can be migrated in the migration epoch, the following are considered:

$$\{|p_j| - \sum_{k=1, i \neq k}^{|S|} \sum_{t'=1}^{t} r_{i,j,k,t'} \leq \beta \cdot (1 - z_{k,j,t+1})\}_{\forall 1 \leq i \leq |S|, 1 \leq j \leq |P|, 1 \leq t \leq T-1} \quad (7)$$

Here, for Eq. (7), the lower bound is found as Eq. (8), which restricts participants to only those geographical areas from which the edge service instance (or binary) can be cloned within the given time:

$$\{|p_j| - \sum_{k=1, i \neq k}^{|S|} \sum_{t'=1}^{t} r_{i,j,k,t'} \geq (1 - z_{k,j,t+1})\}_{\forall 1 \leq i \leq |S|, 1 \leq j \leq |P|, 1 \leq t \leq T-1} \quad (8)$$

Bandwidth

The bandwidth allocated for migration of replica is dependent on the capacity of the shortest path from $s_i$ to $s_k$, in variable $v_{i,k,t}$, $$r_{i,j,k,t'} = \operatorname{argmin}\{|p_j| - \sum_{k=1, i \neq k}^{|S|} \sum_{t'=1}^{t} r_{i,j,k,t'}, v_{i,k,t}\}_{\forall i,k, i \neq k \leq |S|, 1 \leq j \leq |P|, 1 \leq t \leq T} \quad (9)$$

Those skilled in the art will note from the description provided herein that a hybrid edge provisioning process and framework are provided, wherein a secure collaboration platform invocation is used to coordinate between the service provider, network provider, and edge device(s). For instance, to capture the power of narrow-band network slices, a framework for building a virtualized network function (or service) from an existing (or prior) instance of an edge service is provided. In one or more implementations, activating of a new edge service instance includes cloning a new edge service instance from an existing or prior instance of the edge service, potentially with specifications that revise (e.g., scale up or scale down) the resource edge service to match the bandwidth provisioned in the network slice. Further, in one or more implementations, a solution for cloning an edge service instance is provided, which is able to request an exact network slice from the next generation network (e.g., 5G network) to match the needs of the edge service.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    one or more computer-readable storage media and program instructions embodied therewith, the program instructions being readable by a processing circuit to cause the processing circuit to perform a method comprising:
        obtaining one or more service-related parameters for network slice invocation to support an edge service instance, wherein the edge service instance is to execute at an edge device;
        requesting a network slice from a network based on the obtained one or more service-related parameters, the requesting from the network being via a third party collaboration platform that is separate from and coordinates between a host service to supply the edge service instance, the network, and the edge device;
        receiving from the network, based on the requesting of the network slice, network slice invocation codes; and
        initiating, by the host service, activating of the edge service instance on the edge device over the network slice of the network using the network slice invocation codes.

2. The computer program product of claim 1, wherein obtaining the one or more service-related parameters is with reference to service-related parameters of prior instances of the edge service.

3. The computer program product of claim 1, wherein initiating activating of the edge service instance comprises cloning the edge service instance from another instance of the edge service.

4. The computer program product of claim 3, wherein initiating activating of the edge service instance is the an edge device, and cloning the edge service instance comprises cloning the edge service instance from the other instance of the edge service of another edge device.

5. The computer program product of claim 3, wherein the obtained one or more service-related parameters for network slice invocation comprise anticipated bandwidth required for the edge service instance and anticipated execution time of the edge service instance.

6. The computer program product of claim 5, wherein the obtained one or more service-related parameters further comprise anticipated time for cloning the edge service instance from the other instance of the edge service.

7. The computer program product of claim 6, wherein requesting the network slice from the network comprises requesting the network slice from the network tailored to the anticipated bandwidth required for the edge service instance, the anticipated execution time of the edge service instance, and the anticipated time for cloning the other instance of the edge service.

8. The computer program product of claim 1, wherein the collaboration platform comprises a subscription-based platform separate from the host service, the network, and the edge device.

9. A computer-implemented method comprising:
    obtaining one or more service-related parameters for network slice invocation to support an edge service instance, wherein the edge service instance is to execute at an edge device;
    requesting a network slice from a network based on the obtained one or more service-related parameters, the requesting from the network being via a third party collaboration platform that is separate from and coordinates between a host service to supply the edge service instance, the network, and the edge device;
    receiving from the network, based on the requesting of the network slice, network slice invocation codes; and
    initiating, by the host service, activating of the edge service instance on the edge device over the network slice of the network using the network slice invocation codes.

10. The computer-implemented method of claim 9, wherein obtaining the one or more service-related parameters is with reference to service-related parameters of prior instances of the edge service.

11. The computer-implemented method of claim 9, wherein initiating activating of the edge service instance comprises cloning the edge service instance from another instance of the edge service.

12. The computer-implemented method of claim 11, wherein initiating activating of the edge service instance is at the edge device, and cloning the edge service instance comprises cloning the edge service instance from the other instance of the edge service of another edge device.

13. The computer-implemented method of claim 11, wherein the obtained one or more service-related parameters for network slice invocation comprise anticipated bandwidth required for the edge service instance and anticipated execution time of the edge service instance.

14. The computer-implemented method of claim 13, wherein the obtained one or more service-related parameters further comprise anticipated time for cloning the edge service instance from the other instance of the edge service.

15. The computer-implemented method of claim 14, wherein requesting the network slice from the network comprises requesting the network slice from the network tailored to the anticipated bandwidth required for the edge service instance, the anticipated execution time of the edge service instance, and the anticipated time for cloning the other instance of the edge service.

16. A computer system for facilitating processing within a computing environment, the computer system comprising:
a memory; and
at least one processor in communication with the memory, wherein the computer system is configured to perform a method, the method comprising:
obtaining one or more service-related parameters for network slice invocation to support an edge service instance, wherein the edge service instance is to execute at an edge device;
requesting a network slice from a network based on the obtained one or more service-related parameters, the requesting from the network being via a third collaboration platform that is separate from and coordinates between a host service to supply the edge service instance, the network, and the edge device;
receiving from the network, based on the requesting of the network slice, network slice invocation codes; and
initiating, by the host service, activating of the edge service instance on the edge device over the network slice of the network using the network slice invocation codes.

17. The computer system of claim 16, wherein obtaining the one or more service-related parameters is with reference to service-related parameters of prior instances of the edge service.

18. The computer system of claim 16, wherein initiating activating of the edge service instance comprises cloning the edge service instance from another instance of the edge service.

19. The computer system of claim 18, wherein initiating activating of the edge service instance is at the edge device, and cloning the edge service instance comprises cloning the edge service instance from the other instance of the edge service of another edge device.

20. The computer system of claim 19, wherein the obtained one or more service-related parameters for network slice invocation comprise anticipated bandwidth required for the edge service instance and anticipated execution time of the edge service instance.

\* \* \* \* \*